US012039686B2

(12) United States Patent
Li et al.

(10) Patent No.: US 12,039,686 B2
(45) Date of Patent: Jul. 16, 2024

(54) METHOD FOR DYNAMICALLY DISPLAYING THREE-DIMENSIONAL IMAGE OBJECT IN VOLUMETRIC DISPLAY APPARATUS, DYNAMIC VOLUMETRIC DISPLAY APPARATUS, AND COMPUTER-PROGRAM PRODUCT

(71) Applicants: BEIJING BOE OPTOELECTRONICS TECHNOLOGY CO., LTD., Beijing (CN); BOE Technology Group Co., Ltd., Beijing (CN)

(72) Inventors: Xi Li, Beijing (CN); Longhui Wang, Beijing (CN); Xuefeng Wang, Beijing (CN); Jinghua Miao, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/764,472

(22) PCT Filed: May 20, 2021

(86) PCT No.: PCT/CN2021/094961
§ 371 (c)(1),
(2) Date: Mar. 28, 2022

(87) PCT Pub. No.: WO2022/241727
PCT Pub. Date: Nov. 24, 2022

(65) Prior Publication Data
US 2024/0054743 A1 Feb. 15, 2024

(51) Int. Cl.
G06T 19/20 (2011.01)
G06F 3/01 (2006.01)
(Continued)

(52) U.S. Cl.
CPC .............. *G06T 19/20* (2013.01); *G06F 3/017* (2013.01); *G06F 3/0346* (2013.01); *G06T 15/08* (2013.01);
(Continued)

(58) Field of Classification Search
CPC ..... G06T 19/20; G06T 15/08; G06T 2200/04; G06T 2219/2016; G06F 3/017;
(Continued)

(56) References Cited

U.S. PATENT DOCUMENTS

2003/0142144 A1* 7/2003 Balakrishnan .......... G06F 3/033
715/848
2011/0261173 A1* 10/2011 Lin ........................ G09G 3/003
348/57
(Continued)

FOREIGN PATENT DOCUMENTS

CN 101022565 A 8/2007
CN 108196375 A 6/2018
(Continued)

OTHER PUBLICATIONS

International Search Report & Written Opinion mailed Feb. 18, 2022, regarding PCT/CN2021/094961.

*Primary Examiner* — Matthew A Eason
*Assistant Examiner* — Chayce R Bibbee
(74) *Attorney, Agent, or Firm* — Intellectual Valley Law, P.C.

(57) ABSTRACT

A method of dynamically displaying a three-dimensional image object in a volumetric display apparatus is provided. The method includes rotating a display plate about an axis to display a volumetric three-dimensional image; displaying a first three-dimensional image of a first three-dimensional image object according to first coordinates in a first image coordinate system in the volumetric display region; sensing (Continued)

a position or a movement of an external real-world object within a sensing zone; and displaying a second three-dimensional image of a second three-dimensional image object according to second coordinates in a second image coordinate system in the volumetric display region. The second three-dimensional image object is obtained by reorienting the first three-dimensional image object from an initial orientation to a target orientation; and the reorientation is correlated with a position or the movement of the external real-world object.

17 Claims, 10 Drawing Sheets

(51) Int. Cl.
*G06F 3/0346* (2013.01)
*G06T 15/08* (2011.01)
*G09G 3/00* (2006.01)

(52) U.S. Cl.
CPC .......... *G09G 3/003* (2013.01); *G06T 2200/04* (2013.01); *G06T 2219/2016* (2013.01); *G09G 2354/00* (2013.01); *G09G 2360/121* (2013.01)

(58) Field of Classification Search
CPC .. G06F 3/0346; G09G 3/003; G09G 2354/00; G09G 2360/121
See application file for complete search history.

(56) References Cited

U.S. PATENT DOCUMENTS

| | | | |
|---|---|---|---|
| 2015/0355471 A1* | 12/2015 | Yoneno | G02B 5/13 348/51 |
| 2016/0070356 A1* | 3/2016 | Aguirre | G06F 3/011 345/156 |
| 2020/0169717 A1* | 5/2020 | Zavesky | G06V 10/751 |
| 2021/0405389 A1 | 12/2021 | Lv et al. | |

FOREIGN PATENT DOCUMENTS

| | | |
|---|---|---|
| CN | 110458959 A | 11/2019 |
| CN | 110865704 A | 3/2020 |
| JP | 2013105084 A | 5/2013 |
| WO | 2020257795 A1 | 12/2020 |
| WO | 2021085028 A1 | 5/2021 |

* cited by examiner

METHOD FOR DYNAMICALLY DISPLAYING THREE-DIMENSIONAL IMAGE OBJECT IN VOLUMETRIC DISPLAY APPARATUS, DYNAMIC VOLUMETRIC DISPLAY APPARATUS, AND COMPUTER-PROGRAM PRODUCT

CROSS-REFERENCE TO RELATED APPLICATION

This application is a national stage application under 35 U.S.C. § 371 of International Application No. PCT/CN2021/094961, filed May 20, 2021, the contents of which are incorporated by reference in the entirety.

TECHNICAL FIELD

The present invention relates to display technology, more particularly, to a method for dynamically displaying a three-dimensional image object in a volumetric display apparatus, a dynamic volumetric display apparatus, and a computer-program product.

BACKGROUND

Volumetric display device provides a visual representation of an image object in physical three-dimensional space, as opposed to a planar image as in traditional display screens. In a volumetric display device, an observer is able to view the image from multiple directions.

SUMMARY

In one aspect, the present disclosure provides a method of dynamically displaying a three-dimensional image object in a volumetric display apparatus, comprising: rotating a display plate about an axis to display a volumetric three-dimensional image; displaying a first three-dimensional image of a first three-dimensional image object according to first coordinates in a first image coordinate system in the volumetric display region; sensing a position or a movement of an external real-world object within a sensing zone; and displaying a second three-dimensional image of a second three-dimensional image object according to second coordinates in a second image coordinate system in the volumetric display region; wherein the second three-dimensional image object is obtained by reorienting the first three-dimensional image object from an initial orientation to a target orientation; and the reorientation is correlated with a position or the movement of the external real-world object.

Optionally, the method further comprises detecting multiple real-world objects in the sensing zone at the same time; and assigning one of the multiple real-world objects as the external real-world object; wherein the reorientation of the three-dimensional image object is uncorrelated with positions or movements of real-world objects other than the external real-world object.

Optionally, assigning one of the multiple real-world objects as the external real-world object comprises at least one of upon detecting acoustic signals respectively from the multiple real-world objects, selecting from the multiple real-world objects one or more objects having acoustic signals with acoustic intensities within a target intensity range; upon detecting relative distances respectively from the multiple real-world objects to the volumetric display apparatus, selecting from multiple real-world objects one or more objects having relative distances within a target distance range; or upon detecting relative heights of the multiple real-world objects with respect to the volumetric display apparatus, selecting from multiple real-world objects one or more objects having relative heights within a target height range.

Optionally, in the process of assigning one of the multiple real-world objects as the external real-world object, selecting one or more objects having acoustic signals with acoustic intensities within the target intensity range has a higher priority than selecting one or more objects having relative distances within the target distance range, which in turn has a higher priority than selecting one or more objects having relative heights within the target height range.

Optionally, the target intensity range is equal to or greater than 50 decibels; the target distance range is equal to or less than 1 meter; and the target height range is equal to or less than a relative height corresponding to a middle portion of the volumetric display apparatus.

Optionally, subsequent to sensing the position or the movement of the external real-world object within the sensing zone and prior to displaying second three-dimensional image of the three-dimensional image object, further comprising turning off image display on the display plate for a pausing period.

Optionally, sensing the position or the movement of the external real-world object within the sensing zone comprises sensing, by a plurality of sensors, the external real-world object entering from outside the sensing zone to inside the sensing zone; the method further comprises determining a first phase angle, the initial orientation being along a direction from the axis outward at the first phase angle; determining a second phase angle, the target orientation being along a direction from the axis to the external real-world object at the second phase angle; and upon a determination that the first phase angle and the second phase angle being different from each other, displaying the second three-dimensional image of the second three-dimensional image object so that the target orientation is along a direction from the axis outward at the second phase angle.

Optionally, the method further comprises, subsequent to sensing the external real-world object entering from outside the sensing zone to inside the sensing zone and prior to displaying the second three-dimensional image of the three-dimensional image object, turning off image display on the display plate for a pausing period.

Optionally, sensing the position or the movement of the external real-world object within the sensing zone comprises sensing, by a plurality of sensors, the movement of the external real-world object, periodically; wherein the method further comprises sequentially displaying N number of three-dimensional images of the three-dimensional image object respectively according to coordinates respectively in N number of image coordinate systems in the volumetric display region, N≥2; wherein the N number of three-dimensional images are oriented respectively along N number of orientation respectively along directions from the axis to positions of the external real-world object respectively at N number of time points.

Optionally, the method further comprises, subsequent to displaying a n-th three-dimensional image of the three-dimensional image object and prior to displaying a (n+1)-th three-dimensional image of the three-dimensional image object, turning off image display on the display plate fora pausing period, 1≤n≤N.

Optionally, the pausing period is determined according to:

$$t = \frac{1}{f} * \frac{v}{360}$$

wherein t stands for the pausing period, f stands for a frequency of the display plate rotating about the axis, v stands for an angular velocity of the movement of the external real-world object with respect to the axis.

Optionally, the external real-world object is a controller comprising one or more gesture sensors, the controller configured to sense a gesture of a user holding the controller; and the reorientation of the three-dimensional image object follows reorientation of the controller.

Optionally, the method further comprises sequentially detecting N number of controller orientations respectively at N number of time points; and sequentially displaying N number of three-dimensional images of the three-dimensional image object respectively in the volumetric display region, N≥2; wherein reorientation from a n-th three-dimensional image of the three-dimensional image object to a (n+1)-th three-dimensional image of the three-dimensional image object follows reorientation from a n-th controller orientation to a (n+1)-th controller orientation, 1≤n≤N.

Optionally, the method further comprises determining whether the reorientation from the n-th three-dimensional image of the three-dimensional image object to the (n+1)-th three-dimensional image of the three-dimensional image object involves both a rotation about an X-axis and a rotation about a Y-axis with respect to a reference three-dimensional image of the three-dimensional image object; wherein voxel data for displaying the reference three-dimensional image of the three-dimensional image object, is stored in a cache.

Optionally, upon a determination that the reorientation from the n-th three-dimensional image of the three-dimensional image object to the (n+1)-th three-dimensional image of the three-dimensional image object involves both the rotation about the X-axis and the rotation about the Y-axis with respect to the reference three-dimensional image of the three-dimensional image object, the method further comprises generating, by a processor, voxel data for displaying the (n+1)-th three-dimensional image of the three-dimensional image object, without obtaining the voxel data for displaying the reference three-dimensional image of the three-dimensional image object.

Optionally, upon a determination that the reorientation from the n-th three-dimensional image of the three-dimensional image object to the (n+1)-th three-dimensional image of the three-dimensional image object involves only one of the rotation about the X-axis and the rotation about the Y-axis with respect to the reference three-dimensional image of the three-dimensional image object, the method further comprises obtaining the voxel data for displaying the reference three-dimensional image of the three-dimensional image object from the cache, the voxel data comprising data respectively for a reference set of voxels; and reassigning a respective voxel data for a respective reference voxel in the voxel data to a re-assigned voxel; wherein the re-assigned voxel is reoriented with respect to the respective reference voxel as the reorientation from the n-th three-dimensional image of the three-dimensional image object to the (n+1)-th three-dimensional image of the three-dimensional image object.

Optionally, the method further comprises, subsequent to displaying the n-th three-dimensional image of the three-dimensional image object and prior to displaying the (n+1)-th three-dimensional image of the three-dimensional image object, turning off image display on the display plate fora pausing period, 1≤n≤N.

Optionally, displaying the first three-dimensional image of the three-dimensional image object comprises displaying a plurality of first sectional images on the display plate respectively at a plurality of phase angles as the display plate rotating about the axis; and displaying the second three-dimensional image of the three-dimensional image object comprises displaying a plurality of second sectional images on the display plate respectively at the plurality of phase angles as the display plate rotating about the axis.

In another aspect, the present disclosure provides a dynamic volumetric display apparatus, comprising a display plate configured to rotate about an axis to display a volumetric three-dimensional image; one or more sensors configured to sense a position or a movement of an external real-world object within a sensing zone; a memory; one or more processors; wherein the memory and the one or more processors are connected with each other; and the memory stores computer-executable instructions for controlling the one or more processors to cause to display a first three-dimensional image of a first three-dimensional image object according to first coordinates in a first image coordinate system in the volumetric display region; and cause to display a second three-dimensional image of a second three-dimensional image object according to second coordinates in a second image coordinate system in the volumetric display region; wherein the second three-dimensional image object is obtained by reorienting the first three-dimensional image object from an initial orientation to a target orientation; and the reorientation is correlated with a position or the movement of the external real-world object.

In another aspect, the present disclosure provides a computer-program product comprising a non-transitory tangible computer-readable medium having computer-readable instructions thereon, the computer-readable instructions being executable by a processor to cause the processor to perform causing to display a first three-dimensional image of a first three-dimensional image object according to first coordinates in a first image coordinate system in a volumetric display region in a volumetric display apparatus; and causing to display a second three-dimensional image of a second three-dimensional image object according to second coordinates in a second image coordinate system in the volumetric display region; wherein the second three-dimensional image object is obtained by reorienting the first three-dimensional image object from an initial orientation to a target orientation; and the reorientation is correlated with a position or a movement of an external real-world object.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1A:
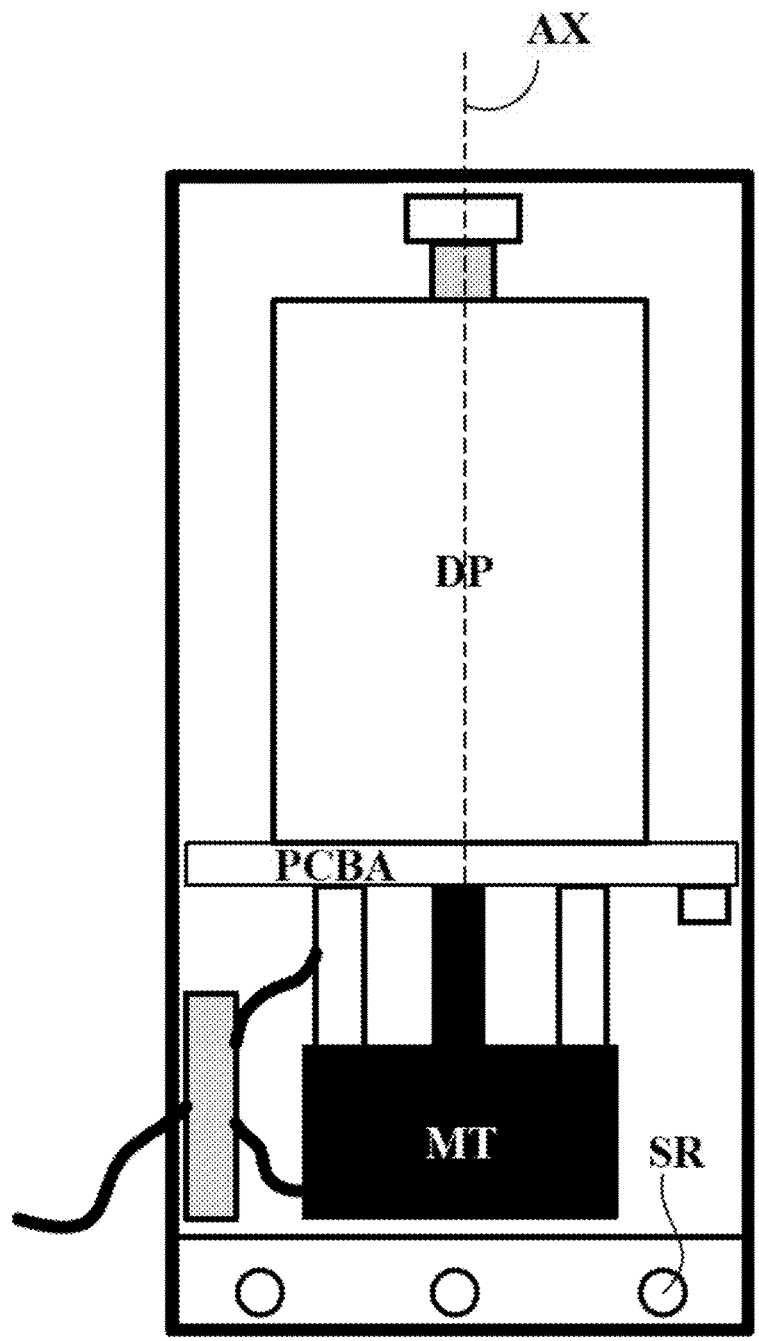
FIG. 1A is a schematic diagram illustrating the structure of a volumetric display apparatus in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a method for dynamically displaying a three-dimensional image object in a volumetric display apparatus, a dynamic volumetric display apparatus, and a computer-program product that substantially obviate one or more of the problems due to limitations and disadvantages of the related art. In one aspect, the present disclosure provides a method for dynamically displaying a three-dimensional image object in a volumetric display apparatus. In some embodiments, the method includes rotating a display plate about an axis to display a volumetric three-dimensional image; displaying a first three-dimensional image of a first three-dimensional image object in the volumetric display region according to first coordinates in a first image coordinate system; sensing a position or a movement of an external real-world object within a sensing zone; and displaying a second three-dimensional image of a second three-dimensional image object in the volumetric display region according to second coordinates in a second image coordinate system. Optionally, the second three-dimensional image object is obtained by reorienting the first three-dimensional image object from an initial orientation to a target orientation. Optionally, the reorientation is correlated with a position or the movement of the external real-world object.

As used herein, the term "display plate" refers to either a display panel or a media configured to display image upon receiving light projected from a light modulator. When the display plate is a display panel, the display plate itself emits light and display an image. Examples of display panels include liquid crystal display panels, organic light emitting diode display panels, micro light emitting diode (micro LED) display panels, mini light emitting diode (mini LED) display panels, etc. Optionally, the display plate is translucent in order to display a three-dimensional image object. When the display plate is a media configured to display image upon receiving light projected from a light modulator, the light plate itself does not necessarily emit light, but rely on light modulator to display image. Optionally, when the display plate is a media configured to display image upon receiving light projected from a light modulator, the volumetric display apparatus may further include a light modulator configured to project a plurality of depth planes of the image on the media.

As used herein, the term "volumetric display" refers to apparatus, method, and system for presenting three-dimensional image to a user in a manner that the three-dimensional image truthfully appears to have actual physical depth. For example, the volumetric display apparatus is operable to act as a device for visually presenting the three-dimensional image in a three-dimensional space. The volumetric display apparatus and method according to the present disclosure enables dynamically displaying three-dimensional image objects.

Figure 1B:
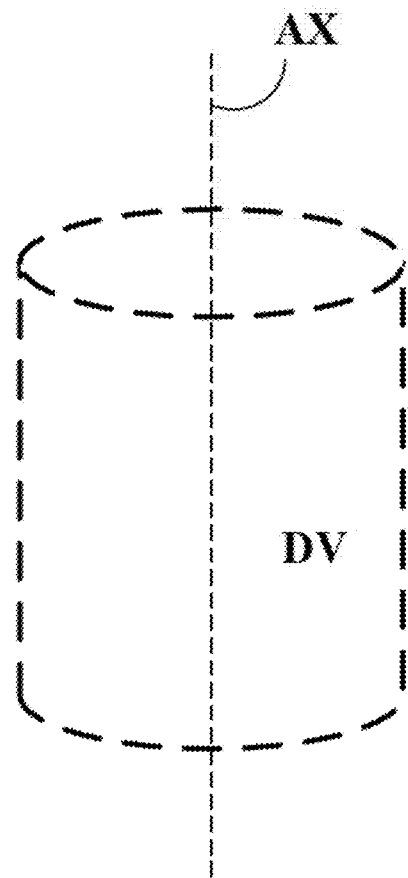
FIG. 1B illustrates a volumetric display region formed by rotating a display plate of a volumetric display apparatus in some embodiments according to the present disclosure.

FIG. 1A is a schematic diagram illustrating the structure of a volumetric display apparatus in some embodiments according to the present disclosure. Referring to FIG. 1A, the volumetric display apparatus in some embodiments includes a display plate DP configured to rotate about an axis AX to display a volumetric three-dimensional image. FIG. 1B illustrates a volumetric display region formed by rotating a display plate of a volumetric display apparatus in some embodiments according to the present disclosure. Referring to FIG. 1B, the volumetric display region DV formed by rotating the display plate is a cylindrical volume. Referring to FIG. 1A, the rotation of the display plate DP may be driven by a motor MT. The volumetric display apparatus in some embodiments further includes a printed circuit board assembly PCBA, which may further include one or more integrated circuit or configured to connected with one or more integrated circuit. The printed circuit board assembly PCBA or the integrated circuit may further include one or more processor and a memory. The memory and the one or more processors are connected with each other. The memory stores computer-executable instructions for controlling the one or more processors to perform various tasks.

Figure 1C:
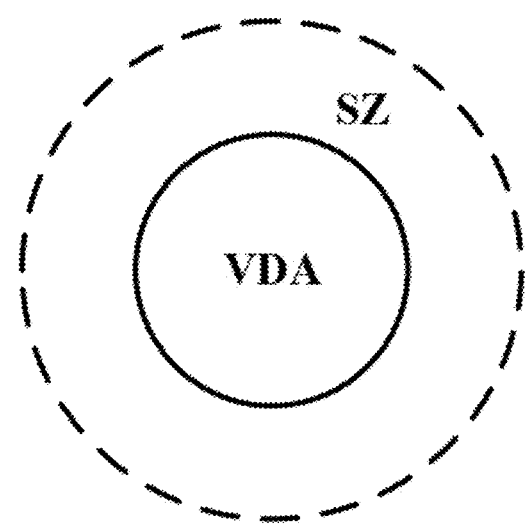
FIG. 1C illustrates a sensing zone of a volumetric display apparatus in some embodiments according to the present disclosure.

In some embodiments, the volumetric display apparatus thither includes one or more sensors SR. FIG. 1A shows the one or more sensors SR are on a pedestal of the volumetric display apparatus, and distributed evenly surrounding a periphery of the pedestal. The one or more sensors SR may be disposed in various suitable positions for sensing various suitable signals, including a position or a movement of an external real-world object. FIG. 1C illustrates a sensing zone of a volumetric display apparatus in some embodiments according to the present disclosure. FIG. 1C shows a plan view along the axis AX of the volumetric display apparatus.

In one example, the sensing zone SZ may be defined by a limit by which the one or more sensors SR may detect a signal. Alternatively, the sensing zone SZ may be predefined by a range set by a user.

In one example, the one or more sensors SR are configured to detect a position or a movement of a human viewer (i.e., the external real-world object in some embodiment is a human viewer). The number of the one or more sensors SR may be determined in any appropriate manner. For example, the number of the one or more sensors SR may be determined by that required for detecting a viewer in the sensing zone SZ present in any angle. In one example, two sensing ranges of two adjacent sensors overlap with each other, or spaced apart by a distance less than a width of a viewer, to ensure detection of the viewer in any position inside the sensing zone SZ.

Examples of suitable sensors include one or any combination of an infrared sensor, an infrared temperature sensor, a pyroelectric sensor, a camera, an acoustic sensor, a geomagnetic sensor, an angular velocity sensor, a gyroscope, etc.

Figure 2A:
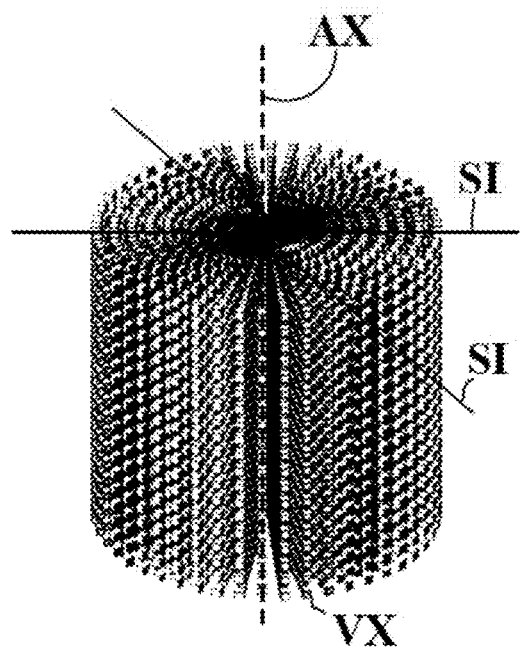
FIG. 2A illustrates a plurality of sectional images displayed on a display plate respectively at a plurality of phase angles as the display plane rotating about the axis in a volumetric display apparatus in some embodiments according to the present disclosure.
Figure 2B:
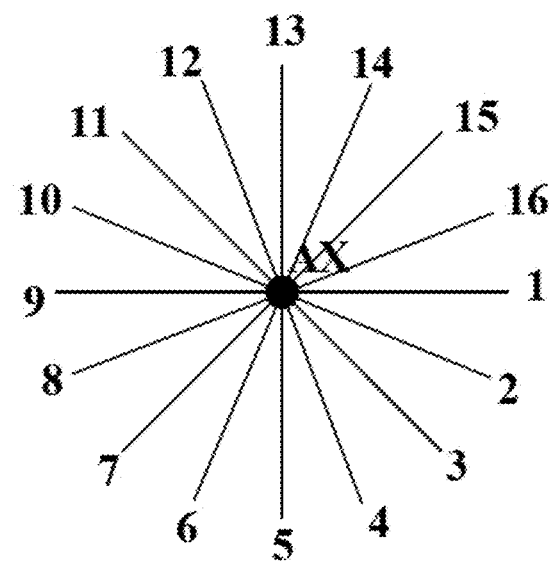
FIG. 2B illustrates a plurality of phase angles in some embodiments according to the present disclosure.

FIG. 2A illustrates a plurality of sectional images displayed on a display plate respectively at a plurality of phase angles as the display plane rotating about the axis in a volumetric display apparatus in some embodiments according to the present disclosure. FIG. 2B illustrates a plurality of phase angles in some embodiments according to the present disclosure. Referring to FIG. 2A and FIG. 2B, the display plate in the volumetric display apparatus in some embodiments is configured to rotated about the axis AX, and respectively at a plurality of phase angles, the display plate is configured to respectively display a plurality of sectional images SI. The display plate may be configured to respectively display any suitable number of sectional images SI respectively at any suitable number of phase angles. FIG. 2B illustrates a total of 16 phase angles (denoted as 1, 2, 3, . . . , 16). In one example, the number of phase angles and the number of sectional images per volume frame is 180. The minimal display element in the volumetric display region is a voxel VX, as illustrated in FIG. 2A. As used herein, the term "voxel" refers to an element that defines a point in a three-dimensional space. A voxel VX in the present disclosure corresponds to a three-dimensional pixel, denoting a smallest volume element unit to which an image display value (e.g., intensity, color, etc.) is assigned. Voxels are combined to visually represent a three-dimensional image object.

Figure 3:
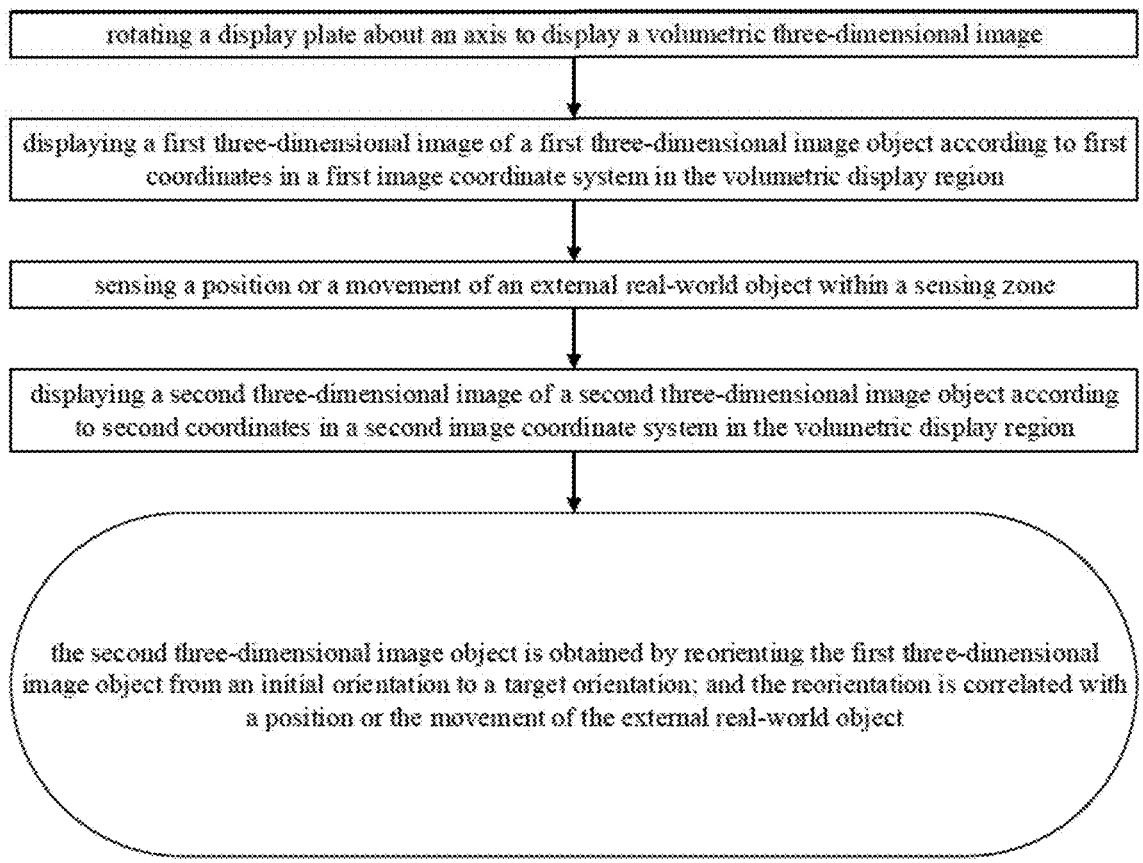
FIG. 3 is a flow chart illustrating a method of dynamically displaying a three-dimensional image object in a volumetric display apparatus in some embodiments according to the present disclosure.

FIG. 3 is a flow chart illustrating a method of dynamically displaying a three-dimensional image object in a volumetric display apparatus in some embodiments according to the present disclosure. Referring to FIG. 3, the method in some embodiments includes rotating a display plate about an axis to display a volumetric three-dimensional image; displaying a first three-dimensional image of the three-dimensional image object in the volumetric display region according to first coordinates in a first image coordinate system; sensing a position or a movement of an external real-world object within a sensing zone; and displaying a second three-dimensional image of the three-dimensional image object in the volumetric display region according to second coordinates in a second image coordinate system. The three-dimensional image object in the second image coordinate system is obtained by reorienting the three-dimensional image object in the first image coordinate system, from an initial orientation to a target orientation. Optionally, the reorientation is correlated with a position or the movement of the external real-world object.

Various suitable real-world object may be used as the external real-world object according to the present disclosure. In one example, the external real-world object is a viewer of the volumetric display apparatus. In another example, the external real-world object is a body part (e.g., a head, an eye, a torso) of a viewer of the volumetric display apparatus. In another example, the external real-world object is any (living or non-living) object that enters the sensing zone. In another example, the external real-world object is a controller such as a remote controller for controlling image display in the volumetric display apparatus.

Figure 4A:
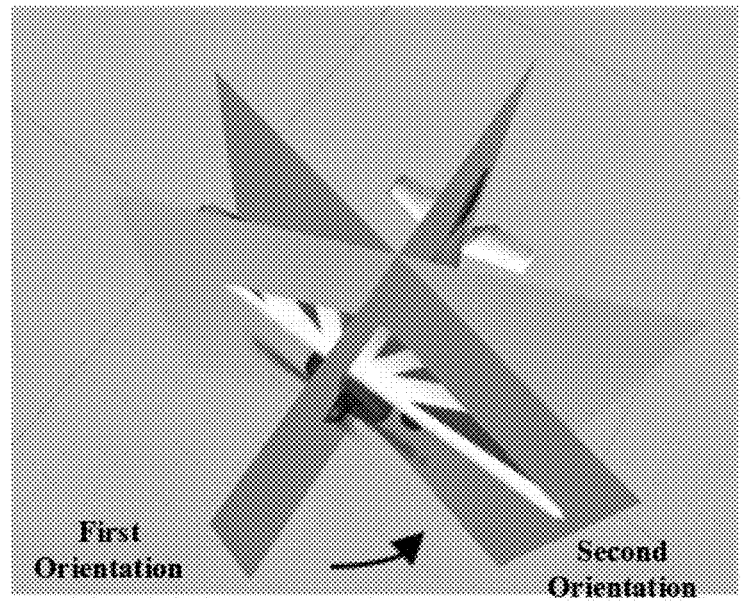
FIG. 4A illustrates reorientation of a three-dimensional image object displayed in a volumetric display apparatus in some embodiments according to the present disclosure.
Figure 4B:
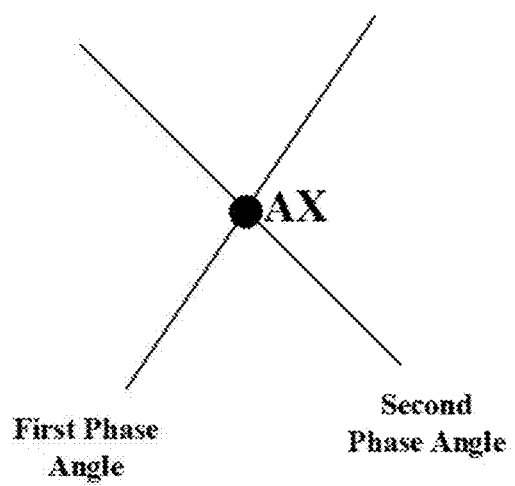
FIG. 4B illustrates phase angles corresponding to the first orientation and the second orientation in FIG. 4A.

FIG. 4A illustrates reorientation of a three-dimensional image object displayed in a volumetric display apparatus in some embodiments according to the present disclosure. Referring to FIG. 4A, the three-dimensional image object displayed in the volumetric display apparatus is a model airplane. In the first orientation, a line connecting the tail and the head of the model airplane is aligned with the first orientation. In the second orientation, the line connecting the tail and the head of the model airplane is not aligned with the second orientation. FIG. 4B illustrates phase angles corresponding to the first orientation and the second orientation in FIG. 4A.

Figure 5A:
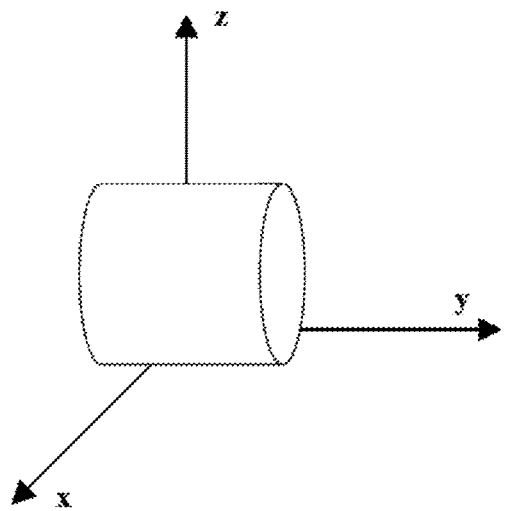
FIGS. 5A and 5B illustrate displaying three-dimensional images of the three-dimensional image object in a volumetric display region respectively according to different coordinates in different image coordinate system in some embodiments according to the present disclosure.
Figure 5B:
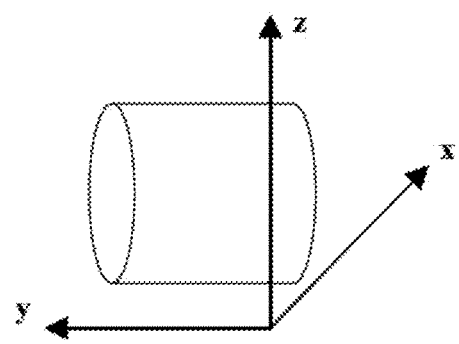

FIGS. 5A and 5B illustrate displaying three-dimensional images of the three-dimensional image object in a volumetric display region respectively according to different coordinates in different image coordinate system in some embodiments according to the present disclosure. As illustrated in FIG. 5A, a first three-dimensional image of the three-dimensional image object is displayed according to first coordinates in a first image coordinate system in the volumetric display region. As illustrated in FIG. 5B, a second three-dimensional image of the three-dimensional image object is displayed according to second coordinates in a second image coordinate system in the volumetric display region. As discussed above (see, e.g., FIG. 2A), the three-dimensional image of the three-dimensional image object is displayed by displaying a plurality of sectional images on the display plate respectively at the plurality of phase angles as the display plane rotating about the axis. Accordingly, the method in some embodiments includes displaying the first three-dimensional image of the three-dimensional image object comprising displaying a plurality of first sectional images on the display plate respectively at a plurality of phase angles as the display plane rotating about the axis; and displaying the second three-dimensional image of the three-dimensional image object comprising displaying a plurality of second sectional images on the display plate respectively at the plurality of phase angles as the display plane rotating about the axis. The three-dimensional image object in the first three-dimensional image is oriented along an initial orientation. The three-dimensional image object in the second three-dimensional image is oriented along a target orientation. The three-dimensional image object in the second image coordinate system is obtained by reorienting the three-dimensional image object in the first image coordinate system, from an initial orientation to a target orientation.

In the present disclosure, the reorientation of the three-dimensional image object is correlated with a position or the movement of the external real-world object. In some embodiments, sensing the position or the movement of the external real-world object within the sensing zone includes sensing, by a plurality of sensors, the external real-world object entering from outside the sensing zone to inside the sensing zone. In one example, prior to the external real world object (e.g., a viewer) appears in the sensing zone, the three-dimensional image object in the first three-dimensional image is oriented along an initial orientation. In another example, subsequent to the external real-world object (e.g., a viewer) enters the sensing zone, the three-dimensional image object in the second three-dimensional image is oriented along a target orientation. In one example, the external real-world object may be sensed by one or more infrared sensors.

Referring to FIG. 4B, the method in some embodiments includes determining a first phase angle, the initial orientation being along a direction from the axis AX outward at the first phase angle; determining a second phase angle, the target orientation being along a direction from the axis AX to the external real-world object at the second phase angle. In one example, the first phase angle and the second phase angle are the same, and there is no need to reorient the three-dimensional image object. In another example, and as shown in FIG. 4B, the first phase angle and the second phase angle are different from each other. In some embodiments, upon a determination that the first phase angle and the second phase angle being different from each other, the method fluffier includes displaying the second three-dimensional image of the three-dimensional image object according to second coordinates in the second image coordinate system so that the target orientation is along a direction from the axis outward at the second phase angle. The viewer, after the three-dimensional image object is reoriented, may view the three-dimensional image object from an orientation of interest (e.g., viewing the head of the model airplane).

In some embodiments, subsequent to sensing the position or the movement of the external real-world object within the sensing zone and prior to displaying second three-dimensional image of the three-dimensional image object, the method further includes turning off image display on the display plate for a pausing period before the display plate refreshes. For example, subsequent to sensing the external real-world object entering from outside the sensing zone to inside the sensing zone and prior to displaying the second three-dimensional image of the three-dimensional image object, the method further includes turning off image display on the display plate for a pausing period.

In some embodiments, the is determined according to $$t = \frac{1}{f} * \frac{n}{360}.$$

In some embodiments, t stands for the pausing period, f stands for a frequency of the display plate rotating about the axis, n stands for an angular difference between the first phase angle and the second phase angle. At the end of the pausing period, the display plate refreshes and display the second three-dimensional image of the three-dimensional image object according to second coordinates in the second image coordinate system so that the target orientation is along a direction from the axis outward at the second phase angle.

In some embodiments, the external real-world object is a moving object, for example, moving around at least a portion of a periphery of the volumetric display apparatus. Accordingly, in some embodiments, sensing the position or the movement of the external real-world object within the sensing zone includes sensing, by a plurality of sensors, the movement of the external real-world object, periodically. For example, the movement of the external real-world object may be sensed periodically at a fixed time interval.

Figure 6:
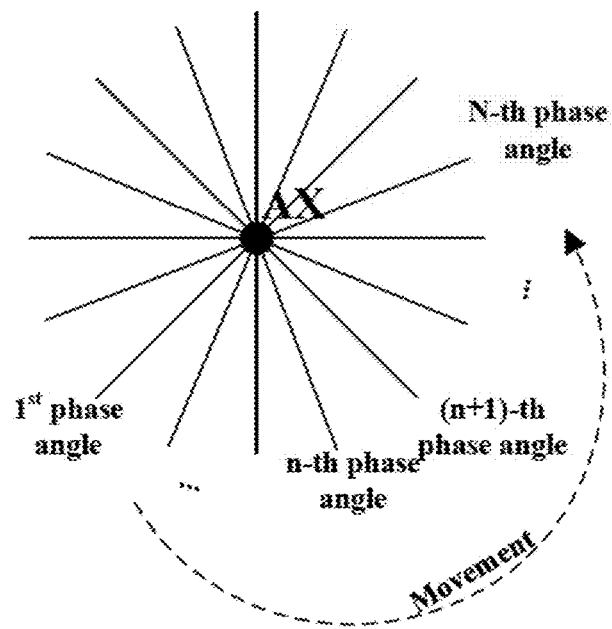
FIG. 6 illustrates a method of dynamically displaying a three-dimensional image object in a volumetric display apparatus as external real-world object moves in some embodiments according to the present disclosure.

In some embodiments, the method in some embodiments further includes sequentially displaying N number of three-dimensional images of the three-dimensional image object respectively according to coordinates respectively in N number of image coordinate systems in the volumetric display region, N≥2. Optionally, the N number of three-dimensional images are oriented respectively along N number of orientation respectively along directions from the axis to positions of the external real-world object respectively at N number of time points. FIG. 6 illustrates a method of dynamically displaying a three-dimensional image object in a volumetric display apparatus as the external real-world object moves in some embodiments according to the present disclosure. Referring to FIG. 6, in one example, N number of phase angles ($1^{st}$ phase angle to N-th phase angle) are respectively aligned with the N number of orientation (e.g., a tail-to-head orientation of the model airplane in FIG. 4) respectively of the three-dimensional image objects in the N number of three-dimensional images. The movement of the external real-world object is denoted in FIG. 6. As the external real-world object moves, the three-dimensional image object periodically reorients so that the orientation of interest (e.g., the tail-to-head orientation of the model airplane in FIG. 4) may be always viewable to the external real-world object (e.g., a viewer).

As discussed above, in some embodiments, the method further includes turning off image display on the display plate for a pausing period before the display plate refreshes, for example, subsequent to displaying a n-th three-dimensional image of the three-dimensional image object and prior to displaying a (n+1)-th three-dimensional image of the three-dimensional image object, turning off image display on the display plate for a pausing period, 1≤n≤N. Referring to FIG. 6, the n-th phase angle and the (n+1)-th phase angle correspond to the n-th orientation and the (n+1)-th orientation of the three-dimensional image object respectively in the -th three-dimensional image and the (n+1)-th three-dimensional image.

In some embodiments, the pausing period is determined according to $$t = \frac{1}{f} * \frac{v}{360}.$$

In some embodiments, t stands for the pausing period, f stands for a frequency of the display plate rotating about the axis, v stands for an angular velocity of the movement of the external real-world object with respect to the axis. At the end of the pausing period, the display plate refreshes and display the (n+1)-th three-dimensional image of the three-dimensional image object according to coordinates in a (n+1)-th image coordinate system so that the target orientation is along a direction from the axis outward at the second phase angle.

In some embodiments, multiple real-world objects are present in the sensing zone at the same time. Accordingly, the method in some embodiments includes selecting one of the multiple real-world objects present in the sensing zone as the external real-world object, a position or a movement of which the reorientation of the three-dimensional image object is correlated with. In some embodiments, the method further includes detecting multiple real-world objects in the sensing zone at the same time; and assigning one of the multiple real-world objects as the external real-world object. The reorientation of the three-dimensional image object is correlated with a position or the movement of the external real-world object. The reorientation of the three-dimensional image object is uncorrelated with positions or movements of real-world objects other than the external real-world object.

In some embodiments, assigning one of the multiple real-world objects as the external real-world object includes, upon detecting acoustic signals respectively from the multiple real-world objects, selecting from the multiple real-world objects one or more objects having acoustic signals with acoustic intensities within a target intensity range. For example, typically a human's normal voice has an acoustic intensity in a range of 40 decibels to 60 decibels. In one example, at least one of the acoustic signals detected has an acoustic intensity greater than 60 decibels, the method includes excluding real-world objects having acoustic signals with acoustic intensities less than 50 decibels. In another example, the target intensity range is equal to or greater than 50 decibels. Only those real-world objects (e.g., viewers) having acoustic signals with acoustic intensities equal to or greater than 50 decibels are selected as objects having acoustic signals with acoustic intensities within the target intensity range.

In some embodiments, assigning one of the multiple real-world objects as the external real-world object includes, upon detecting relative distances respectively from the multiple real-world objects to the volumetric display apparatus, selecting from multiple real-world objects one or more objects having relative distances within a target distance range. In one example, a plurality of infrared sensors disposed on a same horizontal plane (e.g., on the pedestal of the volumetric display apparatus) are configured to detect relative distances respectively from the multiple real-world objects to the volumetric display apparatus. In another example, the target distance range is defined as 1 meter. Only those real-world objects (e.g., viewers) having relative distances equal to or less than 1 meter are selected as objects having relative distances within the target distance range.

Figure 7:
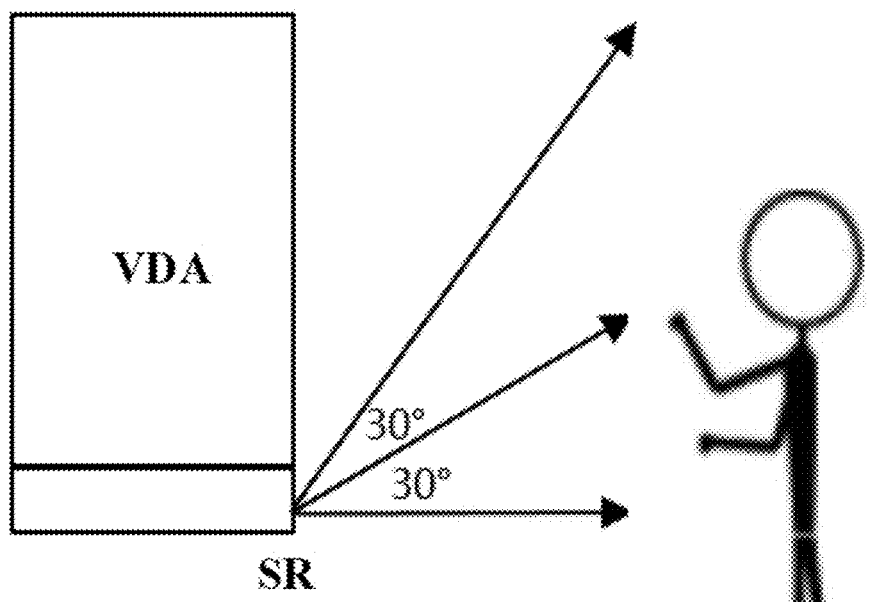
FIG. 7 illustrates a method of detecting relative heights of the multiple real-world objects with respect to the volumetric display apparatus in some embodiments according to the present disclosure.

In some embodiments, assigning one of the multiple real-world objects as the external real-world object includes, upon detecting relative heights of the multiple real-world objects with respect to the volumetric display apparatus, selecting from multiple real-world objects one or more objects having relative heights within a target height range. FIG. 7 illustrates a method of detecting relative heights of the multiple real-world objects with respect to the volumetric display apparatus in some embodiments according to the present disclosure. Referring to FIG. 7, a plurality of infrared sensors are configured to emit infrared radiation respectively at different angles (e.g., at an angular difference of 30 degrees). The target distance range is defined as 1 meter. As shown in FIG. 7, the infrared sensors do not detect any object above a middle portion of the volumetric display apparatus VDA, but only detect one or more objects (e.g., a viewer) at a relative height corresponding to the middle portion of the volumetric display apparatus VDA, or below. The target height range may be defined as the relative height corresponding to the middle portion of the volumetric display apparatus VDA. The viewer detected may be selected as an object having relative heights within the target height range.

In some embodiments, assigning one of the multiple real-world objects as the external real-world object includes a combination of at least two of (1) upon detecting acoustic signals respectively from the multiple real-world objects, selecting from the multiple real-world objects one or more objects having acoustic signals with acoustic intensities within a target intensity range; (2) upon detecting relative distances respectively from the multiple real-world objects to the volumetric display apparatus, selecting from multiple real world objects one or more objects having relative distances within a target distance range; or (3) upon detecting relative heights of the multiple real-world objects with respect to the volumetric display apparatus, selecting from multiple real-world objects one or more objects having relative heights within a target height range.

In some embodiments, assigning one of the multiple real-world objects as the external real-world object includes a combination of (1) upon detecting acoustic signals respectively from the multiple real-world objects, selecting from the multiple real-world objects one or more objects having acoustic signals with acoustic intensities within a target intensity range; (2) upon detecting relative distances respectively from the multiple real-world objects to the volumetric display apparatus, selecting from multiple real-world objects one or more objects having relative distances within a target distance range; and (3) upon detecting relative heights of the multiple real-world objects with respect to the volumetric display apparatus, selecting from multiple real-world objects one or more objects having relative heights within a target height range. Optionally, in the process of assigning one of the multiple real-world objects as the external real-world object, selecting one or more objects having acoustic signals with acoustic intensities within the target intensity range has a higher priority than selecting one or more objects having relative distances within the target distance range, which in turn has a higher priority than selecting one or more objects having relative heights within the target height range.

In some embodiments, the external real-world object is a gesture-sensing controller having one or more gesture sensors. The gesture-sensing controller is configured to sense a gesture of a user holding the controller. Accordingly, the step of sensing the position or the movement of the external real-world object within the sensing zone includes sensing a movement of the gesture-sensing controller (e.g., by the one or more gesture sensors in the gesture-sensing controller). Optionally, the reorientation of the three-dimensional image object follows reorientation of the gesture-sensing controller.

Figure 8:
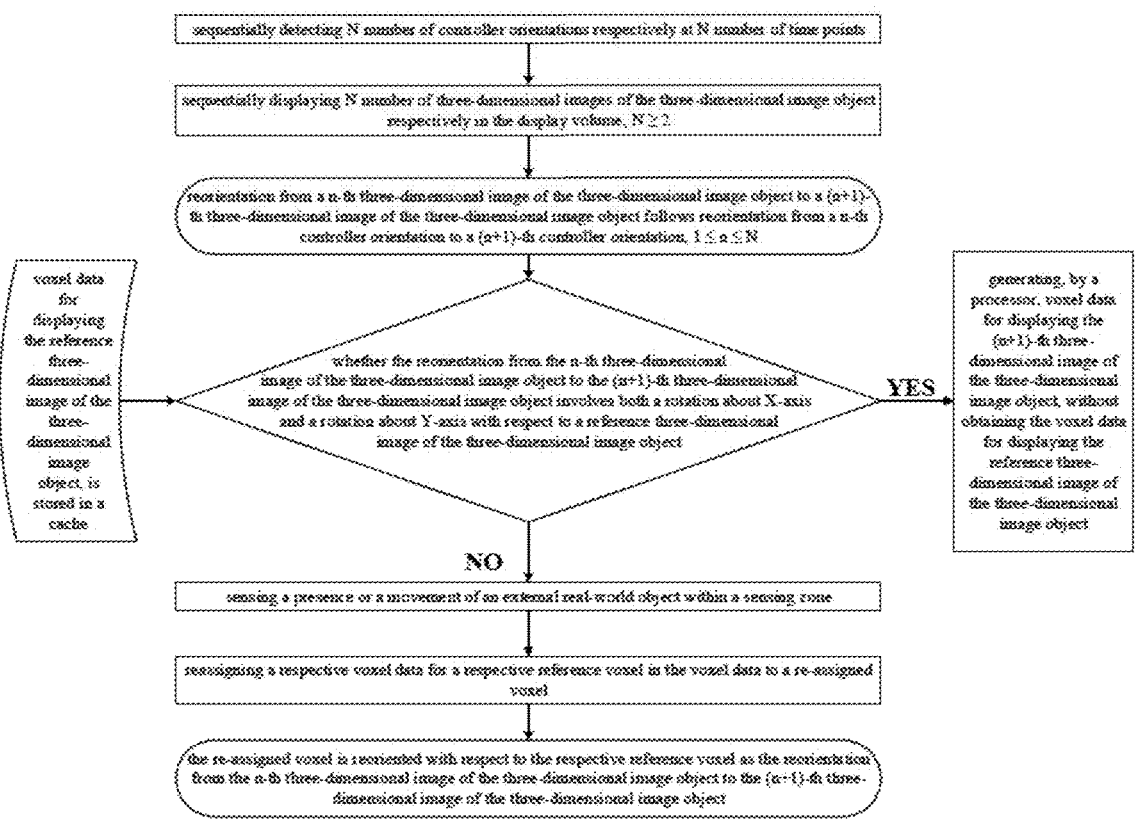
FIG. 8 is a flow chart illustrating a method of dynamically displaying a three-dimensional image object in a volumetric display apparatus in some embodiments according to the present disclosure.

FIG. 8 is a flow chart illustrating a method of dynamically displaying a three-dimensional image object in a volumetric display apparatus in some embodiments according to the present disclosure. Referring to FIG. 8, the method in some embodiments includes sequentially detecting N number of controller orientations respectively at N number of time points; and sequentially displaying N number of three-dimensional images of the three-dimensional image object respectively in the volumetric display region, N≥2.

Figure 9:
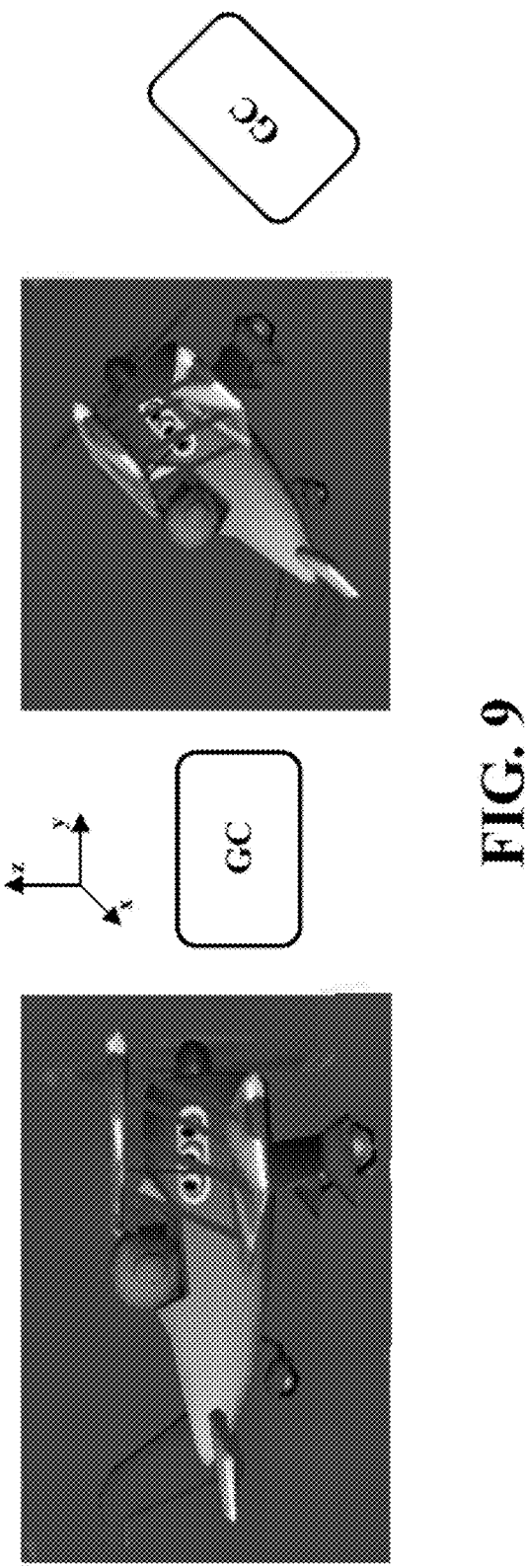
FIG. 9 illustrates reorientation of a three-dimensional image object displayed in a volumetric display apparatus in some embodiments according to the present disclosure.

In some embodiments, reorientation from a n-th three-dimensional image of the three-dimensional image object to a (n+1)-th three-dimensional image of the three-dimensional image object follows reorientation from a n-th controller orientation to a (n+1)-th controller orientation, 1≤n≤N. FIG. 9 illustrates reorientation of a three-dimensional image object displayed in a volumetric display apparatus in some embodiments according to the present disclosure. Referring to FIG. 9, when the gesture-sensing controller GC reorients, e.g., rotates about an X-axis, the three-dimensional image object correspondingly reorients in a same manner, e.g., also rotates about the X-axis.

In some embodiments, the method further includes determining whether the reorientation from the n-th three-dimensional image of the three-dimensional image object to the (n+1)-th three-dimensional image of the three-dimensional image object involves both a rotation about X-axis and a rotation about Y-axis with respect to a reference three-dimensional image of the three-dimensional image object. Optionally, voxel data for displaying the reference three-dimensional image of the three-dimensional image object, is stored in a cache. As used herein, a Z-axis is parallel to the axis AX about which the display plate rotates, and the X-axis and the Y-axis are two other axis with respect to the Z-axis.

When it is determined that the reorientation from the n-th three-dimensional image of the three-dimensional image object to the (n+1)-th three-dimensional image of the three-dimensional image object involves both the rotation about the X-axis and the rotation about the Y-axis with respect to the reference three-dimensional image of the three-dimensional image object, the method in some embodiments further includes generating, by a processor, voxel data for displaying the (n+1)-th three-dimensional image of the three-dimensional image object, without obtaining the voxel data for displaying the reference three-dimensional image of the three-dimensional image object (thus the voxel data are generated de novo). In one specific example, generating the voxel data for displaying the (n+1)-th three-dimensional image of the three-dimensional image object includes calculating a number of sectional image for displaying the (n+1)-th three-dimensional image of the three-dimensional image object. In some embodiments, the method further includes performing a voxelization; a voxel homogenization and voxel point cloud compression to output data for the number of sectional image.

When it is determined that the reorientation from the n-th three-dimensional image of the three-dimensional image object to the (n+1)-th three-dimensional image of the three-dimensional image object involves only one of the rotation about the X-axis and the rotation about the Y-axis with respect to the reference three-dimensional image of the three-dimensional image object, the method in some embodiments further includes obtaining the voxel data for displaying the reference three-dimensional image of the three-dimensional image object from the cache, the voxel data comprising data respectively for a reference set of voxels; and reassigning a respective voxel data for a respective reference voxel in the voxel data to a re-assigned voxel. The re-assigned voxel is reoriented with respect to the respective reference voxel as the reorientation from the n-th three-dimensional image of the three-dimensional image object to the (n+1)-th three-dimensional image of the three-dimensional image object.

In some embodiments, the method further includes, subsequent to displaying the n-th three-dimensional image of the three-dimensional image object and prior to displaying the (n+1)-th three-dimensional image of the three-dimensional image object, turning off image display on the display plate for a pausing period, 1≤n≤N.

In some embodiments, the pausing period is determined according to $$t = \frac{1}{f} * \frac{n}{360}.$$

In some embodiments, t stands for the pausing period, f stands for a frequency of the display plate rotating about the axis, n stands for an angular difference between a n-th phase angle that is aligned with a n-th orientation of the three-dimensional image object in the n-th three-dimensional image and a (n+1)-th phase angle that is aligned with a (n+1)-th orientation of the three-dimensional image object in the (n+1)-th three-dimensional image. At the end of the pausing period, the display plate refreshes and display the (n+1)-th three-dimensional image of the three-dimensional image object according to coordinates in a (n+1)-th image coordinate system so that the target orientation is along a direction from the axis outward at the (n+1)-th phase angle.

The method of dynamically displaying a three-dimensional image object in a volumetric display apparatus according to the present disclosure provides a highly interactive user experience for a viewer of the volumetric display apparatus. Compared to other display methods, the present method enables multiple human-machine interaction modes for three-dimensional volumetric display, whether or not the viewer is immobile or in movement, or whether there is a single viewer or multiple viewers present. Moreover, the present method also enables a viewer to directly interact with the display, or indirectly interact with the display through a controller. The flexibility and highly interactive operation provided by the present method greatly enhances the user experience in viewing a volumetric display apparatus.

In another aspect, the present disclosure provides a dynamic volumetric display apparatus. In some embodiments, the dynamic volumetric display apparatus includes a display plate configured to rotate about an axis to display a volumetric three-dimensional image; one or more sensors configured to sense a position or a movement of an external real-world object within a sensing zone; a memory; and one or more processors. The memory and the one or more processors are connected with each other.

Figure 10:
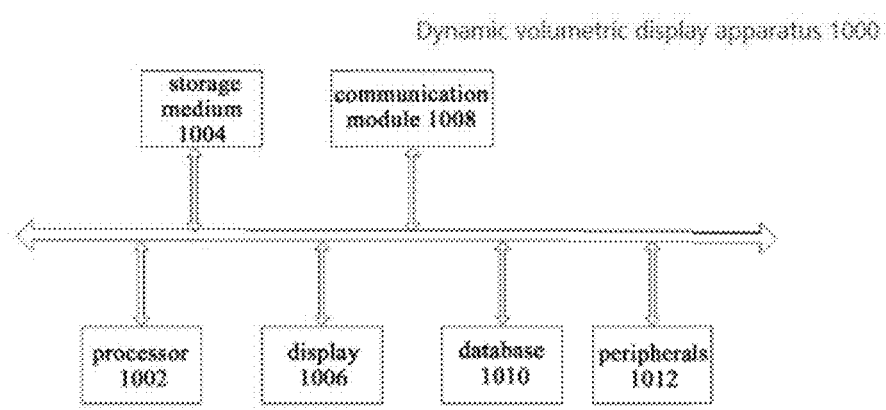
FIG. 10 is a block diagram of a dynamic volumetric display apparatus in some embodiments according to the present disclosure.

FIG. 10 is a block diagram of a dynamic volumetric display apparatus in some embodiments according to the present disclosure. Referring to FIG. 10, in some embodiments, the dynamic volumetric display apparatus 1000 may include any appropriate type of TV, such as a plasma TV, a liquid crystal display (LCD) TV, a touch screen TV, a projection TV, a non-smart TV, a smart TV, etc. The dynamic volumetric display apparatus 1000 may also include other computing systems, such as a personal computer (PC), a tablet or mobile computer, or a smart phone, etc. In addition, the dynamic volumetric display apparatus 1000 may be any appropriate content presentation device capable of presenting any appropriate content. Users may interact with the dynamic volumetric display apparatus 1000 to perform other activities of interest.

As shown in FIG. 10, the dynamic volumetric display apparatus 1000 may include a processor 1002, a storage medium 1004, a display 1006, a communication module 1008, a database 1010 and peripherals 1012. Certain devices may be omitted and other devices may be included to better describe the relevant embodiments.

The processor 1002 may include any appropriate processor or processors. Further, the processor 1002 may include multiple cores for multi-thread or parallel processing. The processor 1002 may execute sequences of computer program instructions to perform various processes. The storage medium 1004 may include memory modules, such as ROM, RAM, flash memory modules, and mass storages, such as CD-ROM and hard disk, etc. The storage medium 1004 may store computer programs for implementing various processes when the computer programs are executed by the processor 1002. For example, the storage medium 1004 may store computer programs for implementing various algorithms when the computer programs are executed by the processor 1002.

Further, the communication module 1008 may include certain network interface devices for establishing connections through communication networks, such as TV cable network, wireless network, internet, etc. The database 1010 may include one or more databases for storing certain data and for performing certain operations on the stored data, such as database searching. The display 1006 may provide information to users. The display 1006 may include any appropriate type of computer display device or electronic apparatus display such as LCD or OLED based devices. The peripherals 112 may include various sensors and other I/O devices, such as keyboard and mouse.

It will be understood by one of ordinary skill in the art that all or some of steps of the method, functional modules/units in the system and the device disclosed above may be implemented as software, firmware, hardware, or suitable combinations thereof. In a hardware implementation, a division among functional modules/units mentioned in the above description does not necessarily correspond to the division among physical components. For example, one physical component may have a plurality of functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on a computer-readable storage medium, which may include a computer storage medium (or a non-transitory medium) and a communication medium (or a transitory medium). The term computer storage medium includes volatile and nonvolatile, removable and non-removable media implemented in any method or technology for storage of information, such as computer readable instructions, data structures, program modules or other data, as is well known to one of ordinary skill in the art. A computer storage medium includes, but is not limited to, RAM, ROM, EEPROM, flash memory or other memory technology, CD-ROM, Digital Versatile Disk (DVD) or other optical disk storage, magnetic cassette, magnetic tape, magnetic disk storage or other magnetic storage device, or any other medium which may be used to store desired information and which may accessed by a computer. In addition, a communication medium typically embodies computer readable instructions, data structures, program modules or other data in a modulated data signal such as a carrier wave or other transport mechanism, and includes any information delivery medium, as is well known to one of ordinary skill in the art.

The flowchart and block diagrams in the drawings illustrate architecture, functionality, and operation of possible implementations of a device, a method and a computer program product according to various embodiments of the present disclosure. In this regard, each block in the flowchart or block diagrams may represent a module, program segment(s), or a portion of a code, which includes at least one executable instruction for implementing specified logical function(s). It should also be noted that, in some alternative implementations, functions noted in the blocks may occur out of the order noted in the drawings. For example, two blocks being successively connected may, in fact, be performed substantially concurrently, or the blocks may sometimes be performed in the reverse order, depending upon the functionality involved. It will also be noted that each block of the block diagrams and/or flowchart, and combinations of blocks in the block diagrams and/or flowchart, may be implemented by special purpose hardware-based systems that perform the specified functions or operations, or combinations of special purpose hardware and computer instructions.

In some embodiments, the memory stores computer-executable instructions for controlling the one or more processors to cause to display a first three-dimensional image of the three-dimensional image object according to first coordinates in a first image coordinate system in the volumetric display region; and cause to display a second three-dimensional image of the three-dimensional image object according to second coordinates in a second image coordinate system in the volumetric display region. Optionally, the three-dimensional image object according to the second coordinates in the second image coordinate system is reoriented with respect to the three-dimensional image object according to the first coordinates in the first image coordinate system, from an initial orientation to a target orientation. Optionally, reorientation of the three-dimensional image object is correlated with a position or the movement of the external real-world object.

In some embodiments, the memory further stores computer-executable instructions for controlling the one or more processors to, subsequent to the one or more sensors sensing the position or the movement of the external real-world object within the sensing zone and prior to causing to display second three-dimensional image of the three-dimensional image object, cause to turn off image display on the display plate for a pausing period.

In some embodiments, the memory further stores computer-executable instructions for controlling the one or more processors to cause to display a plurality of first sectional images on the display plate respectively at a plurality of phase angles as the display plane rotating about the axis, thereby causing to display the first three-dimensional image of the three-dimensional image object; and cause to display a plurality of second sectional images on the display plate respectively at the plurality of phase angles as the display plane rotating about the axis, thereby causing to display the second three-dimensional image of the three-dimensional image object.

In some embodiments, the dynamic volumetric display apparatus further includes a plurality of sensors configured to sense the external real-world object entering from outside the sensing zone to inside the sensing zone. The memory further stores computer-executable instructions for controlling the one or more processors to determine a first phase angle, the initial orientation being along a direction from the axis outward at the first phase angle; determine a second phase angle, the target orientation being along a direction from the axis to the external real-world object at the second phase angle; and upon a determination that the first phase angle and the second phase angle being different from each other, cause to display the second three-dimensional image of the three-dimensional image object according to second coordinates in the second image coordinate system so that the target orientation is along a direction from the axis outward at the second phase angle.

In some embodiments, the memory further stores computer-executable instructions for controlling the one or more processors to, subsequent to the plurality of sensors sensing the external real-world object entering from outside the sensing zone to inside the sensing zone and prior to causing to display the second three-dimensional image of the three-dimensional image object, cause to turn off image display on the display plate for a pausing period.

In some embodiments, the pausing period is determined according to $$t = \frac{1}{f} * \frac{n}{360}.$$

In some embodiments, t stands for the pausing period, f stands for a frequency of the display plate rotating about the axis, n stands for an angular difference between the first phase angle and the second phase angle.

In some embodiments, the dynamic volumetric display apparatus further includes a plurality of sensors configured to sense the movement of the external real-world object, periodically. The memory further stores computer-executable instructions for controlling the one or more processors to cause to sequentially display N number of three-dimensional images of the three-dimensional image object respectively according to coordinates respectively in N number of image coordinate systems in the volumetric display region, N≥2. Optionally, the N number of three-dimensional images are oriented respectively along N number of orientation respectively along directions from the axis to positions of the external real-world object respectively at N number of time points.

In some embodiments, the memory further stores computer-executable instructions for controlling the one or more processors to, subsequent to causing to display a n-th three-dimensional image of the three-dimensional image object and prior to causing to display a (n+1)-th three-dimensional image of the three-dimensional image object, cause to turn off image display on the display plate for a pausing period, 1≤n≤N.

In some embodiments, the pausing period is determined according to $$t = \frac{1}{f} * \frac{v}{360}.$$

In some embodiments, t stands for the pausing period, f stands for a frequency of the display plate rotating about the axis, v stands for au angular velocity of the movement of the external real-world object with respect to the axis.

In some embodiments, the one or more sensors are configured to detect multiple real-world objects in the sensing zone at the same time. The memory further stores computer-executable instructions for controlling the one or more processors to assign one of the multiple real-world objects as the external real-world object. Optionally, the reorientation of the three-dimensional image object is uncorrelated with positions or movements of real-world objects other than the external real-world object.

In some embodiments, the memory further stores computer-executable instructions for controlling the one or more processors to perform at least one of: upon detecting acoustic signals respectively from the multiple real-world objects, select from the multiple real-world objects one or more objects having acoustic signals with acoustic intensities within a target intensity range; upon detecting relative distances respectively from the multiple real-world objects to the volumetric display apparatus, select from multiple real-world objects one or more objects having relative distances within a target distance range; or upon detecting relative heights of the multiple real-world objects with respect to the volumetric display apparatus, select from multiple real-world objects one or more objects having relative heights within a target height range.

In some embodiments, the external real-world object is a human observer.

In some embodiments, the dynamic volumetric display apparatus further includes a gesture-sensing controller having one or more gesture sensors; and the external real-world object is the gesture-sensing controller. Optionally, the reorientation of the three-dimensional image object follows reorientation of the gesture-sensing controller.

In some embodiments, the one or more gesture sensors are configured to sequentially detect N number of controller orientations respectively at N number of time points; the memory further stores computer-executable instructions for controlling the one or more processors to sequentially cause to display N number of three-dimensional images of the three-dimensional image object respectively in the volumetric display region, N≥2. Optionally, reorientation from a n-th three-dimensional image of the three-dimensional image object to a (n+1)-th three-dimensional image of the three-dimensional image object follows reorientation from a n-th controller orientation to a (n+1)-th controller orientation, 1≤n≤N.

In some embodiments, the memory further stores computer-executable instructions for controlling the one or more processors to determine whether the reorientation from the n-th three-dimensional image of the three-dimensional image object to the (n+1)-th three-dimensional image of the three-dimensional image object involves both a rotation about X-axis and a rotation about Y-axis with respect to a reference three-dimensional image of the three-dimensional image object. Optionally, voxel data for displaying the reference three-dimensional image of the three-dimensional image object, is stored in a cache.

In some embodiments, the memory further stores computer-executable instructions for controlling the one or more processors to, upon a determination that the reorientation from the n-th three-dimensional image of the three-dimensional image object to the (n+1)-th three-dimensional image of the three-dimensional image object involves both the rotation about the X-axis and the rotation about the Y-axis with respect to the reference three-dimensional image of the three-dimensional image object, generate voxel data for displaying the (n+1)-th three-dimensional image of the three-dimensional image object, without obtaining the voxel data for displaying the reference three-dimensional image of the three-dimensional image object.

In some embodiments, the memory further stores computer-executable instructions for controlling the one or more processors to, upon a determination that the reorientation from the n-th three-dimensional image of the three-dimensional image object to the (n+1)-th three-dimensional image of the three-dimensional image object involves only one of the rotation about the X-axis and the rotation about the Y-axis with respect to the reference three-dimensional image of the three-dimensional image object, obtain the voxel data for displaying the reference three-dimensional image of the three-dimensional image object from the cache, the voxel data comprising data respectively for a reference set of voxels; and reassign a respective voxel data for a respective reference voxel in the voxel data to a re-assigned voxel. Optionally, the re-assigned voxel is reoriented with respect to the respective reference voxel as the reorientation from the n-th three-dimensional image of the three-dimensional image object to the (n+1)-th three-dimensional image of the three-dimensional image object.

In some embodiments, the memory further stores computer-executable instructions for controlling the one or more processors to, subsequent to causing to display the n-th three-dimensional image of the three-dimensional image object and prior to displaying the (n+1)-th three-dimensional image of the three-dimensional image object, cause to turn off image display on the display plate for a pausing period, 1≤n≤N.

The dynamic volumetric display apparatus according to the present disclosure provides a highly interactive user experience for a viewer of the volumetric display apparatus. Compared to other display apparatus, the present dynamic volumetric display apparatus enables multiple human-machine interaction modes for three-dimensional volumetric display, whether or not the viewer is immobile or in movement, or whether there is a single viewer or multiple viewers present. Moreover, the present dynamic volumetric display apparatus also enables a viewer to directly interact with the display, or indirectly interact with the display through a controller. The flexibility and highly interactive operation provided by the present dynamic volumetric display apparatus greatly enhances the user experience in viewing a volumetric display apparatus.

In another aspect, the present disclosure provides a computer program product. The computer-program product includes a non-transitory tangible computer-readable medium having computer-readable instructions thereon. In some embodiments, the computer-readable instructions are executable by a processor to cause the processor to perform causing to display a first three-dimensional image of the three-dimensional image object according to first coordinates in a first image coordinate system in a volumetric display region in a volumetric display apparatus; and causing to display a second three-dimensional image of the three-dimensional image object according to second coordinates in a second image coordinate system in the volumetric display region. Optionally, the three-dimensional image object according to the second coordinates in the second image coordinate system is reoriented with respect to the three-dimensional image object according to the first coordinates in the first image coordinate system, from an initial orientation to a target orientation. Optionally, reorientation of the three-dimensional image object is correlated with a position or the movement of the external real-world object.

In some embodiments, the computer-readable instructions are further executable by a processor to cause the processor to perform, subsequent to the one or more sensors sensing the position or the movement of the external real-world object within the sensing zone and prior to the dynamic volumetric display apparatus displaying the second three-dimensional image of the three-dimensional image object, causing to turn off image display on the display plate for a pausing period.

In some embodiments, the computer-readable instructions are further executable by a processor to cause the processor to perform causing to display a plurality of first sectional images on the display plate respectively at a plurality of phase angles as the display plane rotating about the axis, thereby causing to display the first three-dimensional image of the three-dimensional image object; and causing to display a plurality of second sectional images on the display plate respectively at the plurality of phase angles as the display plane rotating about the axis, thereby causing to display the second three-dimensional image of the three-dimensional image object.

In some embodiments, the dynamic volumetric display apparatus further includes a plurality of sensors configured to sense the external real-world object entering from outside the sensing zone to inside the sensing zone. The computer-readable instructions are further executable by a processor to cause the processor to perform determining a first phase angle, the initial orientation being along a direction from the axis outward at the first phase angle; determining a second phase angle, the target orientation being along a direction from the axis to the external real-world object at the second phase angle; and upon a determination that the first phase angle and the second phase angle being different from each other, causing to display the second three-dimensional image of the three-dimensional image object according to second coordinates in the second image coordinate system so that the target orientation is along a direction from the axis outward at the second phase angle.

In some embodiments, the computer-readable instructions are further executable by a processor to cause the processor to perform, subsequent to the plurality of sensors sensing the external real-world object entering from outside the sensing zone to inside the sensing zone and prior to causing to display the second three-dimensional image of the three-dimensional image object, causing to turn off image display on the display plate for a pausing period.

In some embodiments, the pausing period is determined according to $$t = \frac{1}{f} * \frac{n}{360}.$$

In some embodiments, t stands for the pausing period, f stands for a frequency of the display plate rotating about the axis, n stands for an angular difference between the first phase angle and the second phase angle.

In some embodiments, the dynamic volumetric display apparatus further includes a plurality of sensors configured to sense the movement of the external real-world object, periodically. The computer-readable instructions are further executable by a processor to cause the processor to perform causing to sequentially display N number of three-dimensional images of the three-dimensional image object respectively according to coordinates respectively in N number of image coordinate systems in the volumetric display region, N≥2. Optionally, the N number of three-dimensional images are oriented respectively along N number of orientation respectively along directions from the axis to positions of the external real-world object respectively at N number of time points.

In some embodiments, the computer-readable instructions are further executable by a processor to cause the processor to perform, subsequent to causing to display a n-th three-dimensional image of the three-dimensional image object and prior to causing to display a (n+1)-th three-dimensional image of the three-dimensional image object, causing to turn off image display on the display plate for a pausing period, 1≤n≤N.

In some embodiments, the pausing period is determined according to $$t = \frac{1}{f} * \frac{v}{360}.$$

In some embodiments, t stands for the pausing period, f stands for a frequency of the display plate rotating about the axis, v stands for an angular velocity of the movement of the external real-world object with respect to the axis.

In some embodiments, the one or more sensors are configured to detect multiple real-world objects in the sensing zone at the same time. The computer-readable instructions are further executable by a processor to cause the processor to perform assigning one of the multiple real-world objects as the external real-world object. Optionally, the reorientation of the three-dimensional image object is uncorrelated with positions or movements of real-world objects other than the external real-world object.

In some embodiments, the computer-readable instructions are further executable by a processor to cause the processor to perform at least one of: upon detecting acoustic signals respectively from the multiple real-world objects, selecting from the multiple real-world objects one or more objects having acoustic signals with acoustic intensities within a target intensity range; upon detecting relative distances respectively from the multiple real-world objects to the volumetric display apparatus, selecting from multiple real-world objects one or more objects having relative distances within a target distance range; or upon detecting relative heights of the multiple real-world objects with respect to the volumetric display apparatus, selecting from multiple real-world objects one or more objects having relative heights within a target height range.

In some embodiments, the external real-world object is a human observer.

In some embodiments, the dynamic volumetric display apparatus further includes a gesture-sensing controller having one or more gesture sensors; and the external real-world object is the gesture-sensing controller. Optionally, the reorientation of the three-dimensional image object follows reorientation of the gesture-sensing controller.

In some embodiments, the one or more gesture sensors are configured to sequentially detect N number of controller orientations respectively at N number of time points; the computer-readable instructions are further executable by a processor to cause the processor to perform sequentially causing to display N number of three-dimensional images of the three-dimensional image object respectively in the volumetric display region, N≥2. Optionally, reorientation from a n-th three-dimensional image of the three-dimensional image object to a (n+1)-th three-dimensional image of the three-dimensional image object follows reorientation from a n-th controller orientation to a (n+1)-th controller orientation. 1≤n≤N.

In some embodiments, the computer-readable instructions are further executable by a processor to cause the processor to perform determining whether the reorientation from the n-th three-dimensional image of the three-dimensional image object to the (n+1)-th three-dimensional image of the three-dimensional image object involves both a rotation about X-axis and a rotation about Y-axis with respect to a reference three-dimensional image of the three-dimensional image object. Optionally, voxel data for displaying the reference three-dimensional image of the three-dimensional image object, is stored in a cache.

In some embodiments, the computer-readable instructions are further executable by a processor to cause the processor to perform, upon a determination that the reorientation from the n-th three-dimensional image of the three-dimensional image object to the (n+1)-th three-dimensional image of the three-dimensional image object involves both the rotation about the X-axis and the rotation about the Y-axis with respect to the reference three-dimensional image of the three-dimensional image object, generating voxel data for displaying the (n+1)-th three-dimensional image of the three-dimensional image object, without obtaining the voxel data for displaying the reference three-dimensional image of the three-dimensional image object.

In some embodiments, the computer-readable instructions are further executable by a processor to cause the processor to perform, upon a determination that the reorientation from the n-th three-dimensional image of the three-dimensional image object to the (n+1)-th three-dimensional image of the three-dimensional image object involves only one of the rotation about the X-axis and the rotation about the Y-axis with respect to the reference three-dimensional image of the three-dimensional image object, obtaining the voxel data for displaying the reference three-dimensional image of the three-dimensional image object from the cache, the voxel data comprising data respectively for a reference set of voxels; and reassigning a respective voxel data for a respective reference voxel in the voxel data to a re-assigned voxel. Optionally, the re-assigned voxel is reoriented with respect to the respective reference voxel as the reorientation from the n-th three-dimensional image of the three-dimensional image object to the (n+1)-th three-dimensional image of the three-dimensional image object.

In some embodiments, the computer-readable instructions are further executable by a processor to cause the processor to perform, subsequent to causing to display the n-th three-dimensional image of the three-dimensional image object and prior to displaying the (n+1)-th three-dimensional image of the three-dimensional image object, causing to turn off image display on the display plate for a praising period, 1≤n≤N.

Various illustrative operations described in connection with the configurations disclosed herein may be implemented as electronic hardware, computer software, or combinations of both. Such operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of dynamically displaying a three-dimensional image object in a volumetric display apparatus, comprising:
    rotating a display plate about an axis to sweep a display volume;
    displaying a first three-dimensional image of the three-dimensional image object according to first coordinates in a first image coordinate system in the display volume;
    sensing a presence or a movement of an external real-world object within a sensing zone;
    displaying a second three-dimensional image of the three-dimensional image object according to second coordinates in a second image coordinate system in the display volume;
    detecting multiple real-world objects in the sensing zone at the same time; and
    assigning one of the multiple real-world objects as the external real-world object;
    wherein the three-dimensional image object according to the second coordinates in the second image coordinate system is reoriented with respect to the three-dimensional image object according to the first coordinates in the first image coordinate system, from an initial orientation to a target orientation; and
    reorientation of the three-dimensional image object is correlated with a position or the movement of the external real-world object;
    wherein the reorientation of the three-dimensional image object is uncorrelated with positions or movements of real-world objects other than the external real-world object;
    wherein assigning one of the multiple real-world objects as the external real-world object comprises at least one of:
    upon detecting acoustic signals respectively from the multiple real-world objects, selecting from the multiple real-world objects one or more objects having acoustic signals with acoustic intensities within a target intensity range;
    upon detecting relative distances respectively from the multiple real-world objects to the volumetric display apparatus, selecting from multiple real-world objects one or more objects having relative distances within a target distance range; or
    upon detecting relative heights of the multiple real-world objects with respect to the volumetric display apparatus, selecting from multiple real-world objects one or more objects having relative heights within a target height range;
    wherein in the process of assigning one of the multiple real-world objects as the external real-world object, selecting one or more objects having acoustic signals with acoustic intensities within the target intensity range has a higher priority than selecting one or more objects having relative distances within the target distance range, which in turn has a higher priority than selecting one or more objects having relative heights within the target height range.

2. The method of claim 1, wherein the target intensity range is equal to or greater than 50 decibels; the target distance range is equal to or less than 1 meter; and the target height range is equal to or less than a relative height corresponding to a middle portion of the volumetric display apparatus.

3. The method of claim 1, subsequent to sensing the presence or the movement of the external real-world object within the sensing zone and prior to displaying second three-dimensional image of the three-dimensional image object, further comprising turning off image display on the display plate for a pausing period.

4. The method of claim 1, wherein sensing the presence or the movement of the external real-world object within the sensing zone comprises sensing, by a plurality of sensors, the external real-world object entering from outside the sensing zone to inside the sensing zone;
    the method further comprises:
    determining a first phase angle, the initial orientation being along a direction from the axis outward at the first phase angle;
    determining a second phase angle, a direction from the axis to the external real-world object at the second phase angle; and
    upon a determination that the first phase angle and the second phase angle being different from each other, displaying the second three-dimensional image of the three-dimensional image object according to the second coordinates in the second image coordinate system so that the target orientation is along a direction from the axis outward at the second phase angle.

5. The method of claim 4, further comprising, subsequent to sensing the external real-world object entering from outside the sensing zone to inside the sensing zone and prior to displaying the second three-dimensional image of the three-dimensional image object, turning off image display on the display plate for a pausing period.

6. The method of claim 1, wherein sensing the presence or the movement of the external real-world object within the sensing zone comprises sensing, by a plurality of sensors, the movement of the external real-world object, periodically;
wherein the method further comprises sequentially displaying N number of three-dimensional images of the three-dimensional image object respectively according to coordinates respectively in N number of image coordinate systems in the display volume, N≥2;
wherein the N number of three-dimensional images are oriented respectively along N number of orientation respectively along directions from the axis to positions of the external real-world object respectively at N number of time points.

7. The method of claim 6, further comprising, subsequent to displaying a n-th three-dimensional image of the three-dimensional image object and prior to displaying a (n+1)-th three-dimensional image of the three-dimensional image object, turning off image display on the display plate for a pausing period, 1≤n≤N.

8. The method of claim 7, wherein the pausing period is determined according to:

$$t = \frac{1}{f} * \frac{v}{360}$$

wherein t stands for the pausing period, f stands for a frequency of the display plate rotating about the axis, v stands for an angular velocity of the movement of the external real-world object with respect to the axis.

9. The method of claim 1, wherein the external real-world object is a controller comprising one or more gesture sensors, the controller configured to sense a gesture of a user holding the controller; and
the reorientation of the three-dimensional image object follows reorientation of the controller.

10. The method of claim 9, further comprising:
sequentially detecting N number of controller orientations respectively at N number of time points; and
sequentially displaying N number of three-dimensional images of the three-dimensional image object respectively in the display volume, N≥2;
wherein reorientation from a n-th three-dimensional image of the three-dimensional image object to a (n+1)-th three-dimensional image of the three-dimensional image object follows reorientation from a n-th controller orientation to a (n+1)-th controller orientation, 1≤n≤N.

11. The method of claim 10, further comprising determining whether the reorientation from the n-th three-dimensional image of the three-dimensional image object to the (n+1)-th three-dimensional image of the three-dimensional image object involves both a rotation about an X-axis and a rotation about a Y-axis with respect to a reference three-dimensional image of the three-dimensional image object;
wherein voxel data for displaying the reference three-dimensional image of the three-dimensional image object, is stored in a cache.

12. The method of claim 11, upon a determination that the reorientation from the n-th three-dimensional image of the three-dimensional image object to the (n+1)-th three-dimensional image of the three-dimensional image object involves both the rotation about the X-axis and the rotation about the Y-axis with respect to the reference three-dimensional image of the three-dimensional image object, further comprising:
generating, by a processor, voxel data for displaying the (n+1)-th three-dimensional image of the three-dimensional image object, without obtaining the voxel data for displaying the reference three-dimensional image of the three-dimensional image object.

13. The method of claim 11, upon a determination that the reorientation from the n-th three-dimensional image of the three-dimensional image object to the (n+1)-th three-dimensional image of the three-dimensional image object involves only one of the rotation about the X-axis and the rotation about the Y-axis with respect to the reference three-dimensional image of the three-dimensional image object, further comprising:
obtaining the voxel data for displaying the reference three-dimensional image of the three-dimensional image object from the cache, the voxel data comprising data respectively for a reference set of voxels; and
reassigning a respective voxel data for a respective reference voxel in the voxel data to a re-assigned voxel;
wherein the re-assigned voxel is reoriented with respect to the respective reference voxel as the reorientation from the n-th three-dimensional image of the three-dimensional image object to the (n+1)-th three-dimensional image of the three-dimensional image object.

14. The method of claim 13, further comprising, subsequent to displaying the n-th three-dimensional image of the three-dimensional image object and prior to displaying the (n+1)-th three-dimensional image of the three-dimensional image object, turning off image display on the display plate for a pausing period, 1≤n≤N.

15. The method of claim 1, wherein displaying the first three-dimensional image of the three-dimensional image object comprises displaying a plurality of first sectional images on the display plate respectively at a plurality of phase angles as the display plate rotating about the axis; and
displaying the second three-dimensional image of the three-dimensional image object comprises displaying a plurality of second sectional images on the display plate respectively at the plurality of phase angles as the display plate rotating about the axis.

16. A dynamic volumetric display apparatus, comprising:
a display plate configured to rotate about an axis to sweep a display volume;
one or more sensors configured to sense a presence or a movement of an external real-world object within a sensing zone;
a memory;
one or more processors;
wherein the memory and the one or more processors are connected with each other; and
the memory stores computer-executable instructions for controlling the one or more processors to:
cause to display a first three-dimensional image of a three-dimensional image object according to first coordinates in a first image coordinate system in the display volume;
cause to display a second three-dimensional image of the three-dimensional image object according to second coordinates in a second image coordinate system in the display volume;
cause to detect multiple real-world objects in the sensing zone at the same time; and cause to assign one of the multiple real-world objects as the external real-world object;

wherein the three-dimensional image object according to the second coordinates in the second image coordinate system is reoriented with respect to the three-dimensional image object according to the first coordinates in the first image coordinate system, from an initial orientation to a target orientation; and reorientation of the three-dimensional image object is correlated with a position or the movement of the external real-world object;

wherein the reorientation of the three-dimensional image object is uncorrelated with positions or movements of real-world objects other than the external real-world object;

wherein assigning one of the multiple real-world objects as the external real-world object comprises at least one of:

upon detecting acoustic signals respectively from the multiple real-world objects, selecting from the multiple real-world objects one or more objects having acoustic signals with acoustic intensities within a target intensity range;

upon detecting relative distances respectively from the multiple real-world objects to the volumetric display apparatus, selecting from multiple real-world objects one or more objects having relative distances within a target distance range; or upon detecting relative heights of the multiple real-world objects with respect to the volumetric display apparatus, selecting from multiple real-world objects one or more objects having relative heights within a target height range;

wherein in the process of assigning one of the multiple real-world objects as the external real-world object, selecting one or more objects having acoustic signals with acoustic intensities within the target intensity range has a higher priority than selecting one or more objects having relative distances within the target distance range, which in turn has a higher priority than selecting one or more objects having relative heights within the target height range.

17. A computer-program product comprising a non-transitory tangible computer-readable medium having computer-readable instructions thereon, the computer-readable instructions being executable by a processor to cause the processor to perform:

causing to display a first three-dimensional image of the three-dimensional image object according to first coordinates in a first image coordinate system in a display volume in a volumetric display apparatus;

causing to display a second three-dimensional image of the three-dimensional image object according to second coordinates in a second image coordinate system in the display volume;

causing to detect multiple real-world objects in the sensing zone at the same time; and causing to assign one of the multiple real-world objects as the external real-world object;

wherein the three-dimensional image object according to the second coordinates in the second image coordinate system is reoriented with respect to the three-dimensional image object according to the first coordinates in the first image coordinate system, from an initial orientation to a target orientation; and reorientation of the three-dimensional image object is correlated with a position or a movement of an external real-world object;

wherein the reorientation of the three-dimensional image object is uncorrelated with positions or movements of real-world objects other than the external real-world object;

wherein assigning one of the multiple real-world objects as the external real-world object comprises at least one of:

upon detecting acoustic signals respectively from the multiple real-world objects, selecting from the multiple real-world objects one or more objects having acoustic signals with acoustic intensities within a target intensity range;

upon detecting relative distances respectively from the multiple real-world objects to the volumetric display apparatus, selecting from multiple real-world objects one or more objects having relative distances within a target distance range; or upon detecting relative heights of the multiple real-world objects with respect to the volumetric display apparatus, selecting from multiple real-world objects one or more objects having relative heights within a target height range;

wherein in the process of assigning one of the multiple real-world objects as the external real-world object, selecting one or more objects having acoustic signals with acoustic intensities within the target intensity range has a higher priority than selecting one or more objects having relative distances within the target distance range, which in turn has a higher priority than selecting one or more objects having relative heights within the target height range.

\* \* \* \* \*